Nov. 11, 1952     K. M. FEIERTAG     2,617,507
MAGNETIC FLUID MIXTURE BRAKE
Filed Dec. 2, 1949
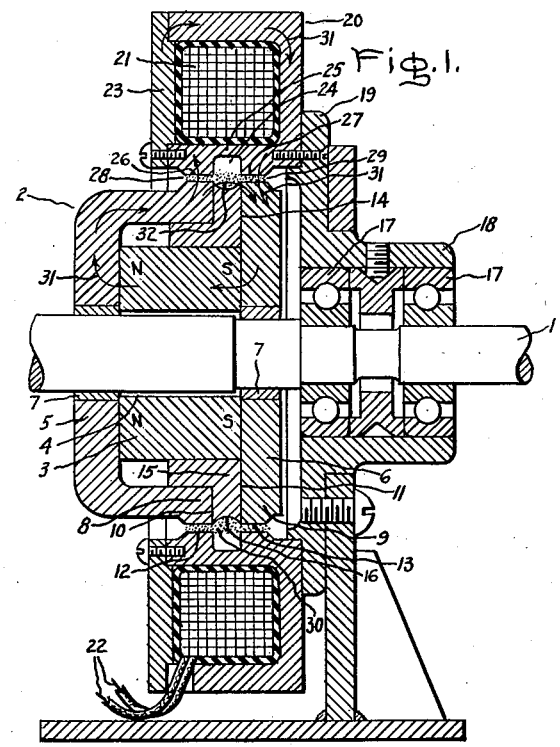
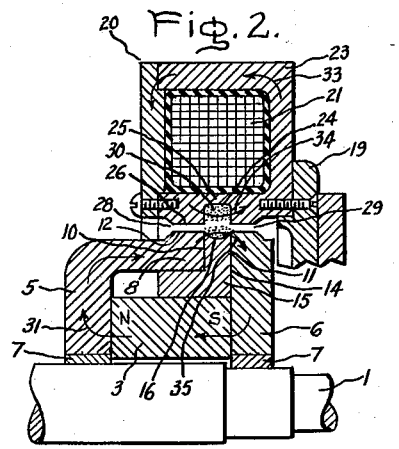
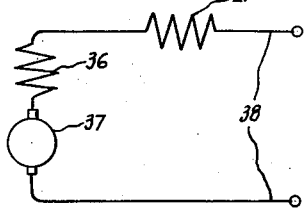
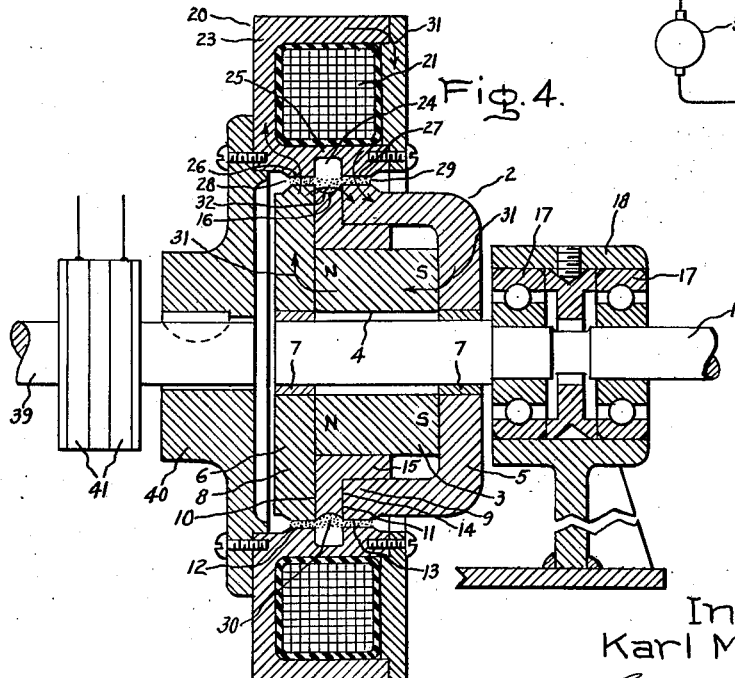
Inventor:
Karl M. Feiertag,
by Ernest H. Britton
His Attorney.

Patented Nov. 11, 1952

2,617,507

UNITED STATES PATENT OFFICE 2,617,507

MAGNETIC FLUID MIXTURE BRAKE

Karl M. Feiertag, Fort Wayne, Ind., assignor to General Electric Company, a corporation of New York Application December 2, 1949, Serial No. 130,682

7 Claims. (Cl. 192—21.5)

This invention relates to brakes, clutches and the like, and more particularly such devices wherein the braking torque or driving connection is formed by the presence of a magnetic fluid mixture in an air gap.

Brakes and clutches have fallen into two general classifications, those utilizing a frictional engagement for the braking torque or driving connection, and those utilizing the eddy current principle. However, both forms possess inherent disadvantages, i. e., in the frictional engagement type of apparatus means must be provided for mechanically establishing and releasing the frictional engagement, and in the eddy current devices large eddy current surfaces must be provided with complicated cooling arrangements.

It is therefore desirable to provide a clutch or brake wherein the braking torque or driving connection neither depends on frictional engagement nor eddy currents.

An object of this invention is to provide an improved brake.

Another object of this invention is to provide an improved clutch.

A further object of this invention is to provide an improved brake wherein the braking torque is provided without frictional engagement or the utilization of eddy currents.

A still further object of this invention is to provide an improved clutch wherein the driven connection is established without frictional engagement or the utilization of eddy currents.

Further objects and advantages of this invention will become apparent, and the invention will be better understood from the following description referring to the accompanying drawing, and the features of novelty which characterize this invention will be pointed out with particularity in the claims annexed to and forming a part of this specification.

In accordance with this invention, there are provided inner and outer relatively rotatable members, the inner member comprising a permanent magnet polarized axially and a pair of annular pole piece members abutting the ends of the permanent magnet. The outer extremities of the pole piece members are spaced apart with the adjacent faces adjacent the outer circumferential edges defining an air gap. A non-magnetic spacer member is positioned in the air gap and has a circumferential groove formed in its outer surface. The outer member has an annular exciting winding surrounded by a magnetic casing. A circumferential groove is formed in the inner circumferential surface of the casing, and the inner circumferential surface portions of the casing on either side of the groove respectively form air gaps with the outer circumferential edges of the pole piece members. A magnetic fluid mixture, for instance one having magnetic iron particles suspended in oil, is arranged in the air gaps between the casing and the pole piece members and the permanent magnet produces flux which traverses these air gaps and the casing, when the winding is not not energized. This permanent magnet flux solidifies the magnetic fluid mixture in the air gaps between the casing and the pole piece members preventing relative rotation of the inner and outer members. The winding is arranged when energized to produce flux in the casing opposing the permanent magnet flux so that no permanent magnet flux traverses the air gaps between the casing and the pole piece members. The flux produced by the winding therefore crosses the circumferential groove in the casing and the permanent magnet flux crosses the air gap between the pole piece members thus diverting the magnetic fluid mixture into the two grooves releasing the connection between the two members so that relative rotation is permitted.

In the drawing, Fig. 1 is a side elevation view partly in section illustrating the improved brake of this invention with the braking connection established; Fig. 2 is a fragmentary view of the device of Fig. 1 shown with the braking connection released; Fig. 3 is a schematic illustration showing a series motor provided with the improved brake of this invention; and Fig. 4 is a side elevation view partly in section illustrating the application of this invention to a clutch.

Referring now to Fig. 1, there is shown a rotatable shaft 1 having a rotatable member generally identified as 2 mounted thereon. The rotatable member 2 is formed of a cylindrical permanent magnet 3 having an opening 4 formed therein to receive the shaft 1. The permanent magnet 3 is polarized axially to form polar areas at its ends as shown in Fig. 1. A pair of annular flux conducting pole piece members 5 and 6 are mounted on the shaft 1 and respectively abut the ends of the permanent magnet 3. In the event that the shaft 1 is formed of magnetic material, it is desirable that the opening 4 of the permanent magnet 3 be sufficiently large to permit the permanent magnet to be spaced from the shaft 1 and the pole pieces 5 and 6 are therefore secured to the shaft 1 by non-magnetic bushings 7. The outer extremities 8 and 9 of the pole piece members 5 and 6 are spaced apart so that the adjacent faces 10 and 11 adjacent the outer circumferential edges 12 and 13 define an air gap 14. A non-magnetic spacer member 15 is positioned in the air gap 14 and is provided with a circumferential groove 16 in its outer surface.

The shaft 1 is rotatably supported by suitable bearings 17 carried by a stationary bearing housing member 18 formed on stationary frame member 19. A stationary member generally identified as 20 is secured to the stationary frame 19 and includes an annular exciting coil 21, adapted to be energized by an external source of power (not shown) by lines 22. The annular exciting winding 21 is surrounded by a magnetic casing member 23 having a circumferential groove 24 formed in its inner circumferential surface. The circumferential groove 24 forms a restricted section 25 in the inner circumferential surface of the magnetic casing 23 and is concentric with the circumferential groove 16 in the non-magnetic spacer 15. The inner circumferential surface portions 26 and 27 on either side of the circumferential groove 24 respectively form air gaps 28 and 29 with the other circumferential edges 12 and 13 of the pole piece members 5 and 6.

In order to provide a braking action, a sufficient quantity of a magnetic fluid mixture 30, for instance magnetic iron particles suspended in oil, is arranged in the air gaps 28 and 29 filling the same when operative, as will be hereinafter described. When the winding 21 is not energized, the permanent magnet 3 produces flux traversing the air gaps 28 and 29 and the magnetic casing 23 as shown by the arrows 31. A small amount of permanent magnet flux may cross the air gap 14 as shown by the arrow 32. By virtue of the flux 31 crossing the air gaps 28 and 29, the magnetic fluid 30 will be solidified, applying braking torque on the rotatable member 2. Referring now to Fig. 2, the coil 21 is arranged to produce flux when energized in the casing member 23 in a direction to oppose the permanent magnet flux 31 as shown by the arrows 33. The winding 21 should preferably be designed to produce M. M. F. sufficient to provide a number of flux lines in the casing 23, except in the restricted section 25, equal to or somewhat in excess to the number of flux lines produced by the permanent magnet 3, taking into consideration the width of the gaps 28 and 29, the length of the magnetic path, etc. Such a flux in the casing 23 will cause the reduced section 25 to become saturated and, as a result, some of the flux will cross the circumferential groove 24 as shown by the arrow 34. Due to the opposition of the exciting winding flux 33 to the permanent magnet flux 31, no flux will traverse the air gaps 28 and 29 causing the permanent magnet flux to traverse the gap 14 and the circumferential groove 16, as shown by the arrow 35. Thus, a substantial portion of the magnetic fluid mixture 30 is diverted to the circumferential grooves 16 and 24 by the fluxes 34 and 35 removing the magnetic fluid from the gaps 28 and 29 releasing the braking torque from the rotatable member 2.

Referring now to Fig. 3, the exciting winding 21 of the brake of Figs. 1 and 2 may be arranged in series with a series field exciting winding 36 of series motor 37 which is energized by an external source of power (not shown) by lines 38. Thus, it is readily apparent that when the motor 37 is energized, the exciting winding 21 of the brake will also be energized and no braking torque will be applied to the rotatable member 2. However, as soon as the motor 37 is deenergized, the exciting winding 21 will also be deenergized so that the braking action is immediately established. It will be readily apparent that no seals need be provided in this construction to prevent leakage of the magnetic fluid mixture since it is always in the solidified state, either in the air gaps 28 and 29 under the influence of the permanent magnet flux 31, or in the circumferential grooves 16 and 24 under the influence of exciting winding flux 34 and permanent magnet flux 35.

Referring now to Fig. 4 in which like parts are indicated by like reference numerals, there is shown a clutch wherein the outer member 20 is mounted on rotatable shaft 39 by means of a flange member 40 keyed to the shaft 39 in any suitable manner. The exciting winding 21 is energized through slip rings 41 on the shaft 39. It will be readily apparent that when the exciting winding 21 is not energized, the permanent magnet flux 31 will traverse the air gaps 28 and 29 and the magnetic casing 23 solidifying the magnetic fluid mixture 30 to provide a driving connection between the outer member 20 and the inner member to conversing, as shown in Fig. 2. When the winding 21 is energized, the flux 33 opposes the permanent magnet flux 31 so that no permanent magnet flux traverses the air gaps 28 and 29, the permanent magnet flux being diverted across the air gap 14 as shown by the arrow 35 in Fig. 2. Thus, the exciting winding flux 34 which crosses the inner circumferential groove 24 and the permanent magnet flux 35 crossing the circumferential groove 16 divert the magnetic fluid mixture 30 into the grooves 16 and 24 releasing the driving connection.

It will now be readily apparent that this invention provides an improved brake or clutch construction wherein no moving parts are necessary, the periodic replacement of a frictional brake or clutch surface is obviated, and no cooling is necessary as in the case of an eddy current device. It will also be readily apparent that the amount of energization of the winding 21 will determine the amount of braking action so that overspeed or over-running can be prevented and in both the clutch and brake embodiments, the action is inherently smooth. It will be further apparent that the improved device of this invention, when used as a brake, fails safe since the braking connection is established when the coil is not energized. In addition, the device functions as an overload clutch. It can be seen that this construction is desirable for a magnetic coupling, for instance, from a synchronous motor to a load, since the coil can be energized while the motor is brought up to speed at which point the coil excitation can be gradually reduced to establish the driving connection after which the coupling is operated with the permanent magnet alone requiring no energization on the coil.

While I have illustrated and described particular embodiments of this invention, modifications thereof will occur to those skilled in the art. I desire it to be understood, therefore, that this invention is not to be limited to the particular arrangements disclosed, and I intend in the appended claims to cover all modifications which do not depart from the spirit and scope of this invention.

What I claim as new and desire to secure by Letters Patent of the United States is:

1. In combination, a pair of relatively rotatable members, one of said members comprising a permanent magnet and a pair of flux conducting pole piece members respectively abutting the polar areas of said permanent magnet, the outer extremities of said pole piece members defining an air gap therebetween, the other of said members comprising an exciting winding and a magnetic casing member surrounding said winding, said magnetic casing member being positioned adjacent said pole piece member respectively forming air gaps therewith, said last mentioned air gaps having a magnetic fluid mixture arranged therein, said permanent magnet producing flux traversing said last mentioned air gaps and said magnetic casing when said winding is not energized so that said magnetic fluid is solidified whereby relative rotation of said relatively rotatable members is prevented, said winding being adapted when energized to produce flux in said casing in a direction to oppose said permanent magnet flux so that no permanent magnet flux traverses said last mentioned air gaps whereby the flux produced by said winding diverts a portion of said magnetic fluid mixture from said last mentioned air gaps permitting relative rotation of said relatively rotatable members.

2. In combination, inner and outer relatively rotatable members, said inner member comprising a permanent magnet polarized axially to form polar areas at its ends and a pair of annular flux conducting pole piece members respectively abutting the ends of said permanent magnet, the outer extremities of said pole piece members being spaced apart with the adjacent faces thereof adjacent the outer edges of said pole piece members respectively defining an air gap, said outer member comprising an annular exciting winding and a magnetic casing member surrounding said winding, the inner circumferential surface of said casing respectively forming air gaps with the outer circumferential edges of said pole piece members, said last mentioned air gaps having a magnetic fluid mixture arranged therein, said permanent magnet producing flux traversing said last mentioned air gaps and said magnetic casing when said winding is not energized so that the said magnetic fluid is solidified whereby relative rotation of said rotatable members is prevented, said winding being adapted when energized to produce flux in said casing in a direction to oppose said permanent magnet flux so that no permanent magnet flux traverses said last mentioned air gaps whereby the flux produced by said winding diverts a portion of said magnetic fluid mixture from said last mentioned air gaps permitting relative rotation of said relatively rotatable members.

3. In combination, inner and outer rotatable members, said inner member comprising a permanent magnet polarized axially to form polar areas at its ends, a pair of annular flux conducting pole piece members respectively abutting the ends of said permanent magnet, the outer extremities of said pole piece members being spaced apart with adjacent faces adjacent the outer edges of said pole piece members respectively defining an air gap, and an annular non-magnetic spacer member positioned in said air gap and having a circumferential groove formed in its outer surface, said outer member comprising an annular exciting winding and a magnetic casing member surrounding said winding with a circumferential groove formed in its inner circumferential surface, the inner circumferential surface portions of said casing member on either side of said circumferential groove respectively forming air gaps with the outer circumferential edges of said pole piece members, said last mentioned air gaps having a magnetic fluid mixture therein, said permanent magnet producing flux traversing said last mentioned air gaps and said casing when said winding is not energized so that said magnetic fluid is solidified whereby relative rotation of said relatively rotatable members is prevented, said winding when energized being adapted to produce flux in said casing in a direction to oppose said permanent flux so that no permanent flux traverses said last mentioned air gaps whereby the flux produced by said winding diverts a portion of said magnetic fluid mixture from said last named air gaps to said circumferential groove in said magnetic casing member permitting relative rotation of said rotatable members.

4. A brake for rotatable apparatus having a rotatable member and a stationary member, one of said members comprising a permanent magnet and a pair of flux conducting pole piece members respectively abutting the polar areas of said permanent magnet, the outer extremities of said pole piece members defining an air gap therebetween, the other of said members comprising an exciting winding and a magnetic casing member surrounding said winding, said magnetic casing member being positioned adjacent said pole piece members respectively forming air gaps therewith, said last mentioned air gaps having a magnetic fluid mixture arranged therein, said permanent magnet producing flux traversing said last mentioned air gaps and said casing when said winding is not energized so that said magnetic fluid is solidified applying braking torque on said other member, said winding being adapted when energized to produce flux in said casing in a direction to oppose said permanent flux so that no permanent flux traverses said last mentioned air gaps whereby the flux produced by said winding diverts a portion of said magnetic fluid mixture from said last mentioned air gaps releasing said braking torque.

5. A brake for rotatable apparatus having an inner rotatable member and an outer stationary member, said rotatable member comprising a permanent magnet polarized axially to form polar areas at its ends and a pair of annular flux conducting pole piece members respectively abutting the ends of said permanent magnet, the outer extremities of said pole piece members being spaced apart with adjacent faces adjacent the outer edges of said pole piece members respectively defining an air gap, said stationary member comprising an annular exciting winding and a magnetic casing member surrounding said winding, the inner circumferential surface of said casing respectively forming air gaps with the outer circumferential edges of said pole piece members, said last mentioned air gaps having a magnetic fluid mixture arranged therein, said permanent magnet producing flux traversing said last mentioned air gaps and said casing when said winding is not energized so that said magnetic fluid is solidified applying braking torque on said rotatable member, said winding being adapted when energized to produce flux in said casing in a direction to oppose said permanet magnet flux so that no permanent flux traverses said last mentioned air gaps whereby the flux produced by said winding diverts a portion of said magnetic fluid mixture from said last mentioned air gaps releasing said braking torque.

6. A brake for rotatable apparatus having a rotatable shaft, a rotatable member mounted on said shaft comprising a permanent magnet polarized axially to form polar areas at its ends, a pair of flux conducting annular pole piece members respectively abutting the ends of said permanent magnet, the outer extremities of said pole piece members being spaced apart with adjacent faces adjacent the outer circumferential edges of said pole piece members respectively defining an air gap, and an annular non-magnetic spacer member positioned in said air gap with a circumferential groove formed in the outer surface thereof, and a stationary member surrounding said rotatable member comprising an annular exciting winding and a magnetic casing member surrounding said winding and having a circumferential groove formed in its inner circumferential surface, the inner circumferential surface portions of said casing on either side of said groove respectively forming air gaps with the outer circumferential edges of said pole piece members, said last mentioned air gaps having a magnetic fluid mixture arranged therein, said permanent magnet producing flux traversing said last mentioned air gaps and said casing when said winding is not energized so that said magnetic fluid is solidified applying braking torque on said rotatable member, said winding being adapted when energized to produce flux in said casing in a direction to oppose said permanent flux so that no permanent magnet flux traverses said last mentioned air gaps whereby the flux produced by said winding diverts a portion of said magnetic fluid mixture from said last mentioned air gaps to said circumferential groove in said magnetic casing member releasing said braking torque.

7. A clutch having a driving and a driven shaft, a rotatable member on one of said shafts comprising a permanent magnet polarized axially to form polar areas at its ends and a pair of annular flux conducting pole piece members respectively abutting the ends of said permanent magnet, the outer extremities of said pole piece members being spaced apart with adjacent faces adjacent the outer circumferential edges of said pole piece members defining an air gap, and an annular non-magnetic spacer positioned in said air gap having a circumferential groove formed in the outer surface thereof, and another rotatable member on the other of said shafts surrounding said first rotatable member and comprising an annular exciting winding, a magnetic casing member surrounding said winding and having a circumferential groove formed in its inner circumferential surface, the inner circumferential surface portions of said casing on either side of said circumferential groove respectively forming air gaps with the outer circumferential edges of said pole piece members, said last mentioned air gaps having magnetic fluid mixture arranged therein, said permanent magnet producing flux traversing said last mentioned air gaps and casing when said winding is not energized so that said magnetic fluid is solidified forming a driving connection between said rotatable members, said winding being adapted when energized to produce flux in said casing in a direction to oppose said permanent flux so that no permanent flux traverses said last mentioned air gaps whereby the flux produced by said winding diverts a portion of said magnetic fluid mixture from said last named air gaps to said circumferential groove in said magnetic casing member releasing said driving connection.

KARL M. FEIERTAG.

REFERENCES CITED

The following references are of record in the file of this patent:

UNITED STATES PATENTS

| Number | Name | Date |
|---|---|---|
| 1,303,484 | Langdon-Davies | May 13, 1919 |
| 2,130,870 | Boehne | Sept. 20, 1938 |
| 2,188,803 | Boehne | Jan. 30, 1940 |
| 2,275,839 | Boehne | Mar. 10, 1942 |
| 2,544,360 | Schmidt | Mar. 6, 1951 |

OTHER REFERENCES

Technical Report 1213, National Bureau of Standards, Washington, D. C. (Copy received in Division 68, U. S. P. O., on March 30, 1948.)